United States Patent
Thiele et al.

(10) Patent No.: US 9,998,249 B2
(45) Date of Patent: Jun. 12, 2018

(54) USER EQUIPMENT AND METHOD FOR ESTIMATING AN INTER CELL INTERFERENCE

(71) Applicants: Huawei Technologies Co., Ltd., Shenzhen (CN); FRAUNHOFER-GESELLSCHAFT ZUR FÖRDERUNG DER ANGEWANDTEN FORSCHUNG E.V., Munich (DE)

(72) Inventors: Lars Thiele, Berlin (DE); Kai Börner, Berlin (DE); Martin Kurras, Berlin (DE); Johannes Dommel, Berlin (DE); Michael Olbrich, Berlin (DE); Thomas Haustein, Potsdam (DE); Malte Schellmann, Munich (DE); Egon Schulz, Munich (DE); Jiayin Zhang, Shanghai (CN); Ni Ma, Shanghai (CN)

(73) Assignees: Huawei Technologies Co., Ltd., Shenzhen (CN); FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 32 days.

(21) Appl. No.: 14/739,897

(22) Filed: Jun. 15, 2015

(65) Prior Publication Data
US 2015/0311994 A1    Oct. 29, 2015

Related U.S. Application Data

(63) Continuation of application No. PCT/EP2012/076842, filed on Dec. 21, 2012.

(51) Int. Cl.
| | |
|---|---|
| *H04L 1/00* | (2006.01) |
| *H04J 11/00* | (2006.01) |
| *H04B 7/0417* | (2017.01) |
| *H04B 17/373* | (2015.01) |
| *H04B 7/04* | (2017.01) |
| *H04B 7/06* | (2006.01) |
| *H04B 17/345* | (2015.01) |

(52) U.S. Cl.
CPC ........ *H04J 11/0053* (2013.01); *H04B 7/0417* (2013.01); *H04B 7/0478* (2013.01);
(Continued)

(58) Field of Classification Search
CPC .................. H04B 7/00; H04L 12/5601; H04L 2012/5603; H04L 2012/5604;
(Continued)

(56) References Cited

U.S. PATENT DOCUMENTS

| | | | |
|---|---|---|---|
| 2010/0002643 A1* | 1/2010 | Han ..................... | H04B 7/0417 370/329 |
| 2012/0044830 A1 | 2/2012 | Kim et al. | |

FOREIGN PATENT DOCUMENTS

| | | |
|---|---|---|
| CN | 101911540 A | 12/2010 |
| CN | 102089995 A | 6/2011 |

(Continued)

OTHER PUBLICATIONS

"3$^{rd}$ Generation Partnership Project; Technical Specification Group Radio Access Network; Evolved Universal Terrestrial Radio Access (E-UTRA); Physical Channels and Modulation (Release 10)," 3GPP Ts 36.211, V10.1.0, pp. 1-103, 3$^{rd}$ Generation Partnership Project, Valbonne, France (Mar. 2011).

(Continued)

*Primary Examiner* — Dady Chery
(74) *Attorney, Agent, or Firm* — Leydig, Voit & Mayer, Ltd.

(57) ABSTRACT

A user equipment, UE (4), registered with an anchor cell base station (3-0) of an anchor cell (2-0) of a cellular wireless network (1), the UE (4) comprising a determination unit being adapted to predict an inter cell interference, ICI, at the UE (4), caused by base stations (3-1 to 3-6) of neighboring cells (2-1 to 2-6), depending on precoding matrix indicators, PMIs, of precoding matrices, PMs, the
(Continued)

PMIs being exchanged between the anchor cell base station (3-0) of the anchor cell (2-0) and the base stations (3-1 to 3-6) of the neighboring cells (2-1 to 2-6).

20 Claims, 11 Drawing Sheets

(52) U.S. Cl.
CPC ......... *H04B 17/373* (2015.01); *H04B 7/0639* (2013.01); *H04B 17/345* (2015.01)

(58) Field of Classification Search
CPC ..... H04L 2012/5607; H04L 2012/5608; H04L 12/18; H04L 12/184; H04L 12/1845; H04L 12/185; H04L 2012/5642; H04L 2012/64; H04Q 2213/1329; H04Q 2213/29; H04J 2203/0019
USPC .................................. 370/252, 328, 329, 341
See application file for complete search history.

(56) References Cited

FOREIGN PATENT DOCUMENTS

| WO | WO 2009084905 A2 | 7/2009 |
|---|---|---|
| WO | WO 2010002230 A2 | 1/2010 |
| WO | WO 2010104343 A2 | 9/2010 |
| WO | WO 2011018031 A1 | 2/2011 |
| WO | WO 2011123460 A1 | 10/2011 |

OTHER PUBLICATIONS

Thiele et al., "Channel Aging effects in CoMP Transmission: Gains from Linear Channel Prediction," Proceedings of the 2011 45th Asilomar Conference on Signals, Systems and Computers, pp. 1924-1928, Institute of Electrical and Electronics Engineers, New York, New York (Nov. 6-9, 2011).

Osseiran et al., "Closed Loop Transmit Diversity in WCDMA HS-DSCH," Proceedings of the Spring 2005 IEEE Vehicular Technology Conference, pp. 349-353, Institute of Electrical and Electronics Engineers, New York, New York (May 2005).

Thiele et al., "Multi-Cell Channel Estimation using Virtual Pilots," Proceedings of the Spring 2008 IEEE Vehicular Technology Conference, pp. 1211-1215, Institute of Electrical and Electronics Engineers, New York, New York (May 2008).

Yu et al., "MU-MIMO Downlink Transmission Strategy Based on the Distributed Antennas for 3GPP LTE-A," Proceedings of the 2010 IEEE Global Telecommunications Conference, pp. 450-454, Institute of Electrical and Electronics Engineers, New York, New York (Dec. 2010).

CN 201280077732.X, Office Action and Search Report, dated Nov. 3, 2017.

* cited by examiner

| Codebook for PMI selection: | Sequences with specific PMIs | 1 | PMI 1 | PMI 2 | PMI 1 |
|---|---|---|---|---|---|
| PMI 1<br>PMI 2<br>PMI 3<br>PMI 4 | | 2 | PMI 4 | PMI 2 | PMI 3 |
| | Sequences with generic PMIs | 1 | PMI a | PMI a | PMI b |
| | | 2 | PMI b | PMI a | PMI a |

PMI a = PMI 1   or   PMI a = PMI 2
PMI b = PMI 3        PMI b = PMI 4

Fig. 6

USER EQUIPMENT AND METHOD FOR ESTIMATING AN INTER CELL INTERFERENCE

CROSS-REFERENCE TO RELATED APPLICATIONS

This application is a continuation of International Patent Application No. PCT/EP2012/076842, filed on Dec. 21, 2012, which is hereby incorporated by reference in its entirety.

TECHNICAL FIELD

The invention relates to a user equipment and a method for estimating an inter cell interference in a cellular wireless network comprising cells, wherein each cell comprises a base station.

BACKGROUND

A cellular wireless network can comprise a plurality of cells, wherein each cell comprises a base station. Whereas in some cellular wireless networks the cells are of similar size, other cellular networks can comprise cells of different sizes including macrocells, microcells as well as picocells. The use of MIMO (Multiple Input-Multiple Output) antenna techniques has increased the possible data throughput of a cellular network. In a MIMO system there are more than one transmit antenna to send a signal on the same frequency and more than one receive antenna. Whereas traditional cellular networks generally provide a best service under line of sight conditions, the MIMO system is most sufficient under rich scattering conditions where signals bounce around the environment. Under rich scattering conditions signals from different antennas take multiple paths to reach the UE at different times. To achieve a high throughput the MIMO system uses a technique, the so-called spatial multiplexing. By use of spatial multiplexing the data rate can be increased. To do this, the data is divided into separate streams, wherein the data streams are transmitted independently via separate antennas. In spatial multiplexing each antenna has a different data stream to multiple receiving antennas. These data streams are then reconstructed separately by the UE. In spatial multiplexing, although multiple data streams are transmitted, the total power of the transmission remains the same. With spatial multiplexing the total signal to noise ratio, SNR, is distributed between multiple data streams, wherein each of which has a lower power level. Consequently, each data stream contains a lower SNR than would be possible with a single data stream.

Each set of data sent through the antennas in spatial multiplexing operation is also called a layer. In spatial multiplexing, rank refers to the number of data streams transmitted over the same kind of frequency resource, corresponding to the number of layers.

FIG. 1 shows a diagram for illustrating spatial multiplexing as employed in a conventional wireless cellular network. Spatial multiplexing works by creating separate data streams on multiple antennas. With spatial multiplexing, independent data streams can be transmitted simultaneously on the same frequency resource by mapping them to so called spatial layers. The number of spatial layers is the same as the rank, R, of the precoding matrix used for data transmissions. As shown in FIG. 1 in a multi layer transmission, data arriving from a higher level process comprises codewords. Each codeword is then mapped onto one or more layers. Each layer is then mapped onto one or more antennas using a precoding matrix.

In the present patent application, the following abbreviations are used:
ACI Active Codebook Information
BBU Base Band Unit
CAS Central Antenna System
CQI Channel Quality Indicator
CPM Cluster Precoding Matrix
CB Codebook
DAS Distributed Antenna System
ICI Inter Cell Interference
MIMO Multiple Input Multiple Output
PDCCH Physical Downlink Control Channel
PM Precoding Matrix
PMI Precoding Matrix Indicator
RI Rank Indicator
RRU Remote Radio Unit
SINR Signal to Noise plus Interference Ratio
UE User Equipment A cellular network can operate in an open or closed loop. In an open loop operation the base station receives minimal information.

In closed loop operations the UE analyses the channel conditions of each transmitting antenna including the multipath conditions. In closed loop operations the UE provides an RI as well as a PMI, which indicates the optimum PM for the current channel conditions. Moreover, the UE can provide a CQI given the RI and the PMI. This allows the base station to quickly and effectively adapt the transmission to channel conditions. Closed loop operations are particularly relevant for spatial multiplexing, where the MIMO system offers the greatest throughput gains.

In multiple layer transmissions data arrives from higher level processes in one or more codewords, wherein each codeword is then mapped onto one or more layers. Each layer is then mapped onto one or more antennas using a PM. This PM can be taken from a CB, wherein a predetermined set of PMs is stored. Each PM comprises a corresponding PMI.

The MIMO system can be implemented for instance in an LTE network. In general, an SINR of a UE depends on both signal power and ICI. The prediction or estimation of ICI is an important factor to improve the CQI precision and thus link adaption. In real systems, link adaption is always affected by a delay of the CQI feedback. The effect of Doppler shift may be alleviated by channel prediction methods.

In a standard wireless network such as a LTE network each UE provides feedback on the PMI which can be wideband, and CQI which can be wideband or provided per each subband.

Based on the received feedback, a base station scheduler decides to provide resources in the time/frequency/space for a set of UEs in the respective cell of the wireless network. Each base station can select its UEs according to the following predetermined scheduling policies on the basis of the received feedback. The main reasons for performance loss are related to a feedback delay Channel conditions may change in the meantime and therefore scheduling decisions may not be optimal any longer. This cell-dependent CB selection for a PM can be used for a precoding downlink transmission. Each cell of the wireless network may optimize the downlink precoding configuration for its own UEs. Hence, after reconfiguration, the ICI which is caused by neighbouring cells can significantly change its spatial structure. Thus, the downlink interference observed at the UE side may be highly dynamic.

The experienced multicell or ICI strongly depends on the PMs selected by the neighbouring base stations. When base stations adjust the PMs due to user movements or altered traffic conditions, the ICI experienced by UE in the neighbouring cells may significantly change. Precoding and transmission configurations in these cells of the wireless network, which were based on the interference situation generated by the previous selection of PMs and precoding weights in the cell, do then no longer match the actual interference situation and a performance degradation can be observed.

Accordingly, there is a need to provide an apparatus and a method for providing a reliable estimation of ICI within a wireless network using changing PMs.

SUMMARY

In a first aspect of the present invention, a UE registered with an anchor cell base station of an anchor cell of a cellular wireless network is provided, wherein the UE comprises a determination unit being adapted to predict an ICI at the UE, caused by base stations of neighbouring cells, depending on PMIs of PMs, the PMIs being exchanged between the anchor cell base station of the anchor cell and the base stations of the neighbouring cells.

The prediction of the ICI from a neighbouring base station can be performed by multiplying the PMI used by the base station with a channel function between the UE and the base station that has been measured by the UE.

In a first possible implementation form of the UE according to the first aspect of the present invention, the UE comprises an interface for receiving the PMIs from the anchor cell base station.

In a second possible implementation form of the UE according to the first aspect of the present invention or according to the first implementation form of the first aspect of the present invention, the ICI predicted by the determination unit of the UE is advertised by the UE to its anchor cell base station.

In a third possible implementation form of the UE according to the second implementation form of the first aspect of the present invention, the ICI predicted by the UE and advertised by the UE to its anchor cell base station is evaluated by the anchor cell base station, to select a PMI of a matching PM.

In a fourth possible implementation form of the UE according to the first aspect of the present invention as such or according to any of the preceding implementation forms of the first aspect of the present invention, the PMIs of the PMs exchanged between the anchor cell base station of the anchor cell and the base stations of the neighbouring cells indicate PMIs to be used by a base station in a predetermined number of future subframes.

In a fifth possible implementation form of the UE according to the first aspect of the present invention as such or according to any of the preceding implementation forms of the first aspect of the present invention, the UE is adapted to predict the ICI at the UE on the basis of the exchanged PMIs and channel transfer functions of physical channels between the UE and the base stations of all neighbouring cells, measured by the UE.

In a sixth possible implementation form of the UE according to the first aspect of the present invention as such or according to any of the preceding implementation forms of the first aspect of the present invention, the PMIs indicate an optimum PM used by the base station for a current channel condition between the anchor cell base station and the UE.

In a seventh possible implementation form of the UE according to the first aspect of the present invention as such or according to any of the preceding implementation forms of the first aspect of the present invention, the exchanged PMIs are supplied as ACI by the anchor cell base station to the UE via a PDCCH.

In an eighth possible implementation form of the UE according to the first aspect of the present invention as such or according to any of the preceding implementation forms of the first aspect of the present invention, the ACI comprises a timestamp indicating how long the ACI is valid.

In a ninth possible implementation form of the UE according to the first aspect of the present invention as such or according to any of the preceding implementation forms of the first aspect of the present invention, the exchanged PMIs form a PM indication sequence comprising a fixed pattern of specific PMIs or a generic pattern of arbitrary PMIs.

In a tenth possible implementation form of the UE according to the first aspect of the present invention as such or according to any of the preceding implementation forms of the first aspect of the present invention, the predicted ICI received by the anchor cell base station from the UE is evaluated by the anchor cell base station, to select a PMI of a matching PM, wherein by selecting the respective PMI an SINR of a reception signal received by the registered UE in the anchor cell is maximized.

According to a second aspect of the present invention, a method for estimating an ICI, in a cellular wireless network comprising cells is provided, wherein each cell comprises a base station, the method comprising the steps of:

exchanging PMIs of PMs between an anchor cell base station of an anchor cell and base stations of neighbouring cells; and predicting, by a UE registered with the anchor cell base station, an ICI at the UE, caused by the base stations of the neighbouring cells, depending on the exchanged PMIs supplied by the anchor cell base station.

The prediction of the ICI from a neighbouring base station can be performed by multiplying the PMI used by the base station with a channel function between the UE and the base station that has been measured by the UE.

In a first possible implementation form of the method according to the second aspect of the present invention, the UE comprises an interface for receiving the PMIs from the anchor cell base station.

In a second possible implementation form of the method according to the second aspect of the present invention or according to the first implementation form of the second aspect of the present invention, the ICI predicted by the determination unit of the UE is advertised by the UE to its anchor cell base station.

In a third possible implementation form of the method according to the second implementation form of the second aspect of the present invention, the ICI predicted by the UE and advertised by the UE to its anchor cell base station is evaluated by the anchor cell base station, to select a PMI of a matching PM.

In a fourth possible implementation form of the method according to the second aspect of the present invention as such or according to any of the preceding implementation forms of the second aspect of the present invention, the PMIs of the PMs exchanged between the anchor cell base station of the anchor cell and the base stations of the neighbouring cells indicate PMIs to be used by a base station in a predetermined number of future subframes.

In a fifth possible implementation form of the method according to the second aspect of the present invention as such or according to any of the preceding implementation forms of the second aspect of the present invention, the UE predicts the ICI at the UE on the basis of the exchanged PMIs and channel transfer functions of physical channels between the UE and the base stations of all neighbouring cells, measured by the UE.

In a sixth possible implementation form of the method according to the second aspect of the present invention as such or according to any of the preceding implementation forms of the second aspect of the present invention, the PMIs indicate an optimum PM used by the base station for a current channel condition between the anchor cell base station and the UE.

In a seventh possible implementation form of the method according to the second aspect of the present invention as such or according to any of the preceding implementation forms of the second aspect of the present invention, the exchanged PMIs are supplied as ACI by the anchor cell base station to the UE via a PDCCH.

In an eighth possible implementation form of the method according to the second aspect of the present invention as such or according to any of the preceding implementation forms of the second aspect of the present invention, the ACI comprises a timestamp indicating how long the ACI is valid.

In a ninth possible implementation form of the method according to the second aspect of the present invention as such or according to any of the preceding implementation forms of the second aspect of the present invention, the exchanged PMIs form a PM indication sequence comprising a fixed pattern of specific PMIs or a generic pattern of arbitrary PMIs.

In a tenth possible implementation form of the method according to the second aspect of the present invention as such or according to any of the preceding implementation forms of the second aspect of the present invention, the predicted ICI received by the anchor cell base station from the UE is evaluated by the anchor cell base station, to select a PMI of a matching PM, wherein by selecting the respective PMI an SINR of a reception signal received by the registered UE in the anchor cell is maximized.

According to a third aspect of the present invention, a base station of an anchor cell (2-0) of a cellular wireless network is provided, comprising an evaluation unit being adapted to evaluate an ICI, wherein the ICI is predicted by a UE registered with the base station, caused by base stations of neighbouring cells, depending on PMIs of PMs, the PMIs being exchanged between the base station of the anchor cell and the base stations of the neighbouring cells.

In a first possible implementation form of the base station according to the third aspect of the present invention, an SINR of a reception signal received by the UE in the anchor cell in view of the predicted ICI is maximized by selecting the respective PMI.

According to a fourth aspect of the present invention, a wireless cellular network is provided, the wireless cellular network comprising cells, each cell comprising a base station, wherein PMIs of PMs are exchanged between base stations of neighbouring cells, and a UE registered with an anchor cell base station is adapted to predict an ICI at the UE, caused by the base stations of the neighbouring cells, depending on the exchanged PMIs.

In a first possible implementation form of the wireless cellular network according to the fourth aspect of the present invention, the wireless cellular network is a wireless multi-antenna network comprising a CAS or a DAS.

The aspects of the present invention allow for a reliable prediction of SINR conditions at the UE, which improves the precision of CQI values used for link adaption. Consequently, a higher throughput on link level as well as on system level can be achieved, thus improving the achievable overall spectral efficiency in the cellular wireless network.

BRIEF DESCRIPTION OF THE FIGURES

In the following, possible embodiments and implementations of the present invention are described with reference to the enclosed figures in more detail.

FIG. 6 shows a diagram for illustrating possible implementations of a method according to an embodiment of the present invention;

DETAILED DESCRIPTION OF EMBODIMENTS

Figure 1:
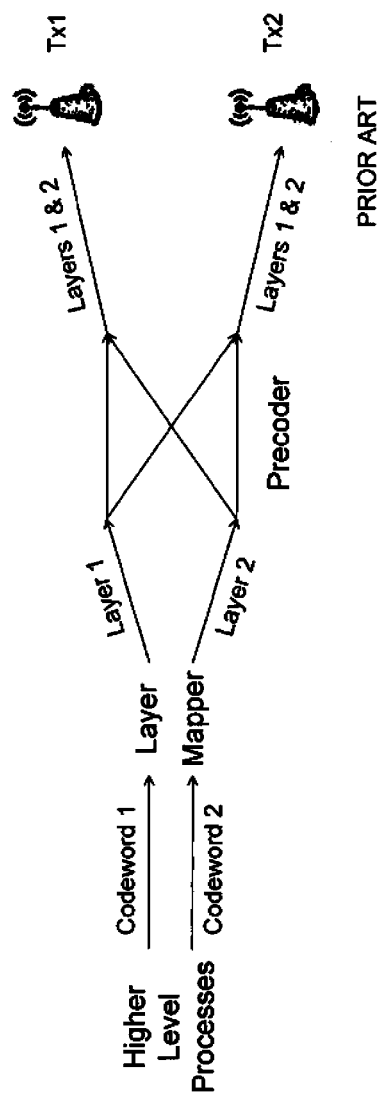
FIG. 1 shows a diagram for illustrating a precoding mechanism in a conventional MIMO system.
Figure 2:
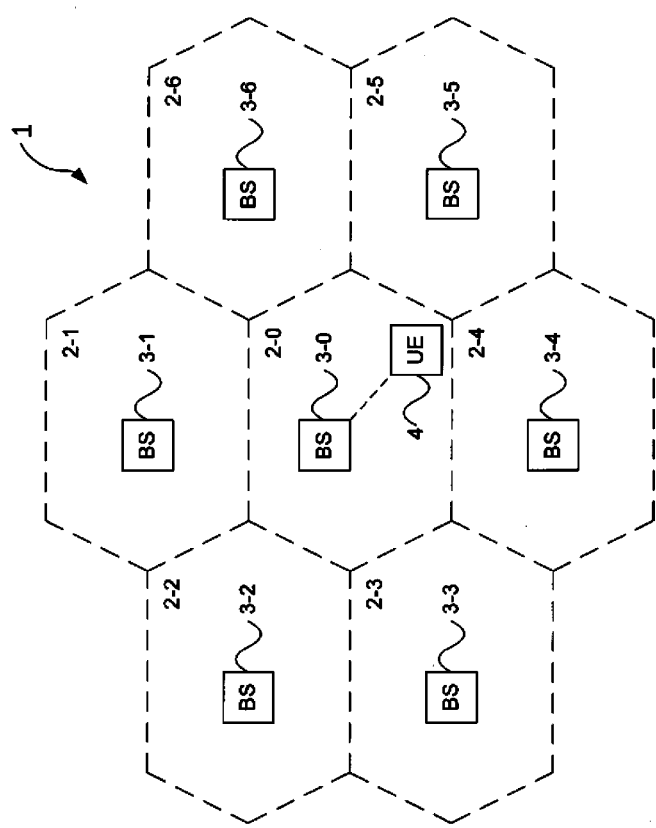
FIG. 2 shows a diagram for illustrating a possible structure of an implementation for a wireless cellular network according to an embodiment of the present invention, wherein a method for estimating an ICI, according to an embodiment of the present invention, can be performed.

FIG. 2 shows a schematic diagram of a possible implementation of a cellular wireless network 1 according to an embodiment of the present invention. As can be seen in FIG. 2, the cellular wireless network 1 comprises a plurality of cells 2-I, each cell comprising a base station 3-$i$. In the diagram of FIG. 2 cells 2-1 to 2-7 are shown each having a base station 3-1 to 3-7. FIG. 2 shows a cluster of cells 2-$i$, wherein an anchor cell 2-0 is surrounded by neighbouring cells 2-1 to 2-6. In the implementation shown in FIG. 2 the cellular wireless network 1 is a homogeneous network comprising cells 2-i of similar size. In an alternative implementation the cellular wireless network 1 can also be a heterogeneous network comprising cells of different types and size such as macrocells, microcells or even picocells. Accordingly, the cell structure of the cells 2-i of the cellular wireless network 1 as shown in FIG. 2 is exemplary only and the structure of the cellular wireless network 1 may vary comprising cells of different cells and types.

The base stations 3-i of the cellular wireless network 1 can be connected to each other by means of a backhaul network providing network interfaces between the base stations. Each base station 3-i can comprise a BBU which is connected to BBUs of neighbouring cells. A BBU of a cell 2-i can be connected to one or several RRUs. Each RRU can be provided directly at the location of the base station 3-i or can be at a remote location within the cell and connected to the base station via a link. Each RRU can comprise several antennas which are adapted to transmit and receive signals to/from a UE 4 registered with the base station 3-i of the respective cell 2-i. The UE 4 can be any kind of mobile terminal such as a mobile phone. The cellular system can make use of RRUs in a DAS, to provide a more uniform coverage, reduced outage and higher throughputs especially in indoor locations. The DAS can be combined with MIMO communications concepts by treating the RRUs at a distributed antenna array and/or equipping the RRUs with multiple antennas.

The base stations 3-i shown in the cellular wireless network 1 in FIG. 2 can be formed by eNodeBs of an LTE wireless network. The base stations 3-i can be connected to each other via an X2 interface. In an alternative implementation the wireless cellular network shown in FIG. 2 can also be formed by a WIMAX network or a UMTS network.

In the wireless cellular network 1 as illustrated in the example of FIG. 2 each cell 2-i has a base station 3-i, wherein PMIs of PMs are exchanged between the base station 3-i of neighbouring cells. The exchange of PMIs is performed via a backhaul network connecting the base stations 3-i with each other. The UE 4 registered with the anchor cell base station 3-0 is adapted to predict an ICI at the UE caused by the base stations of the neighbouring cells 2-1 to 2-6 depending on the exchanged PMI. The number of neighbouring cells of the anchor cell 2-0 can vary. In the exemplary embodiment shown in FIG. 2 all neighbouring cells 2-1 to 2-6 are located in a first ring around the anchor cell 2-0. In alternative embodiments the neighbouring cells can also be located in a further ring around the anchor cell 2-0. The exchanged current PMIs are provided for selecting a PM from a CB. The PMIs can be valid for a specified number of future subframes. This exchange of PMIs can easily be done in case of co-located antennas or a CAS. Further, the information exchange can be performed between DASs connected to the same BBU.

Figure 3:
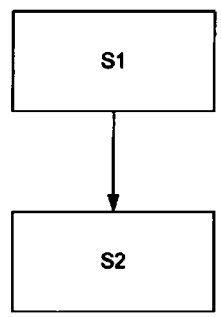
FIG. 3 shows a flow chart of a possible implementation of a method for estimating an ICI in a cellular wireless network, according to an embodiment of the present invention.

FIG. 3 shows a flow chart of a possible implementation of a method for estimating an ICI in a cellular wireless network 1, according to an embodiment of the present invention. As can be seen in FIG. 3, the method for estimating an ICI in a cellular wireless network comprising cells, each cell having a base station 3-i, comprises two main steps.

In a first step S1 the PMIs of PMs are exchanged between an anchor cell base station 3-0 and base stations 3-i of neighbouring cells 2-i. For example, the PMIs of PMs are exchanged between the anchor cell base station 3-0 and the base stations of the neighbouring cells 2-1 to 2-6.

In a further step S2 the UE 4 registered with the anchor cell base station 3-0 of the anchor cell 2-0 predicts an ICI at the UE 4 caused by the base stations 3-1 to 3-6 of the neighbouring cells 2-1 to 2-6, depending on the PMIs exchanged in step S1 and supplied by the anchor cell base station 3-0 to the registered UE 4 via a downlink. In a possible implementation the ICI from a neighbouring base station is performed by multiplying the PMI used by the base station with the channel function between the UE and the base station, that has been measured by the UE.

In a further step the predicted ICI predicted in step S2 can be advertised by the UE 4 to the anchor cell base station 3-0 to which it is registered. The ICI predicted by the registered UE 4 and advertised by the UE 4 to its anchor cell base station 3-0 can be evaluated in a possible implementation form by the anchor cell base station 3-0, to select a PMI of a matching PM, wherein by selecting the respective PMI a signal quality of a reception signal received by the registered UE 4 is maximized.

For measuring the signal quality one or several predetermined signal quality metrics can be used. A possible metric used for measuring the signal quality can be the SINR. The PMIs of the PMs exchanged between the anchor cell base station 3-0 and the base stations 3-i of the neighbouring cells 2-i can indicate PMs to be used by a base station in a predetermined number of future subframes. In a possible implementation the registered UE 4 predicts in step S2 the ICI at the UE 4 on the basis of the exchanged PMIs and on the basis of channel transfer functions of physical channels between the registered UE 4 and the base stations of all neighbouring cells measured by the registered UE 4. The PMIs can indicate an optimum PM used by the base station for a current channel condition between all base stations and the registered UE 4.

In a possible implementation form the exchanged PMIs exchanged in step S1 are supplied as ACI by the anchor cell base station 3-0 to the registered UE 4 via a predetermined channel such as the PDCCH. Via the PDCCH each cell provides ACI for a set of neighbouring cells to its assigned and registered UEs 4. The ACI can include a cell-specific selection of active PMIs for precoded downlink services for a set of neighbouring base stations or eNodeBs. Moreover, the ACI can comprise in a possible implementation form a timestamp indicating how long the ACI is valid. A timestamp can be an index which is defined either per cell or as a common value for all cells inside the cell cluster as shown in FIG. 2. In a possible embodiment form the exchanged PMIs can form a PM indication sequence. This PM indication sequence can comprise a fixed pattern of specific PMIs or a generic pattern of arbitrary PMIs as also illustrated in FIG. 6.

The ICI received by the anchor cell base station 3-0 from the registered UE 4 can be evaluated by the anchor cell base station 3-0 to select a PMI of a matching PM, to maximize a SINR of a reception signal received by the registered UE 4 in the anchor cell 2-0 in view of the predicted ICI.

The prediction or estimation method according to an embodiment of the present invention allows flexibility to choose CBs from PMs in frequency and time. The interaction delay is the time duration of a selected PMI configuration at a given base station. As a result the ICI to a given base station 3-i is kept predictable for a time duration equivalent to the interaction delay. The signalization delay is the time duration required for exchanging active PMI information between neighbouring base stations and the additional time duration for a downlink signalization to the registered UEs. The time duration required for exchanging the active PMI information depends on the configuration of the backhaul network connecting the base stations 3-*i* with each other. Additional time duration for downlink signalization to the UEs is cell-specific and can be optimized to accommodate the registered UE 4 of the respective cell 2-*i*.

Figure 4:
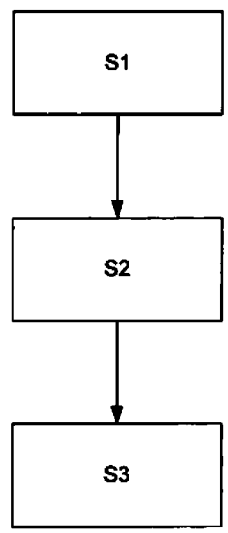
FIG. 4 shows a flow chart of a possible implementation of a method for stabilizing an ICI in a cellular wireless network.

Further, a stabilized ICI in a cellular wireless network 1 is provided, comprising the steps as shown in the flow chart of FIG. 4. Herein, the ICI in a cellular wireless network is not only predicted but also stabilized. As illustrated in the implementation shown in FIG. 4, the method for providing a stabilized ICI in a cellular wireless network 1 comprises steps S1 and S2 of the method for estimating an ICI at a UE 4 registered with an anchor cell base station 3-0, according to an embodiment of the present invention, and a further main step S3. In step S3 the predicted ICI at the UE 4 is advertised by the registered UE 4 to its anchor cell base station 3-0. At the anchor cell base station 3-0 the advertised predicted ICI of the UE 4 is evaluated to select a PMI of a matching PM, to maximize the signal quality of a reception signal received by the registered UE 4.

Figure 5:
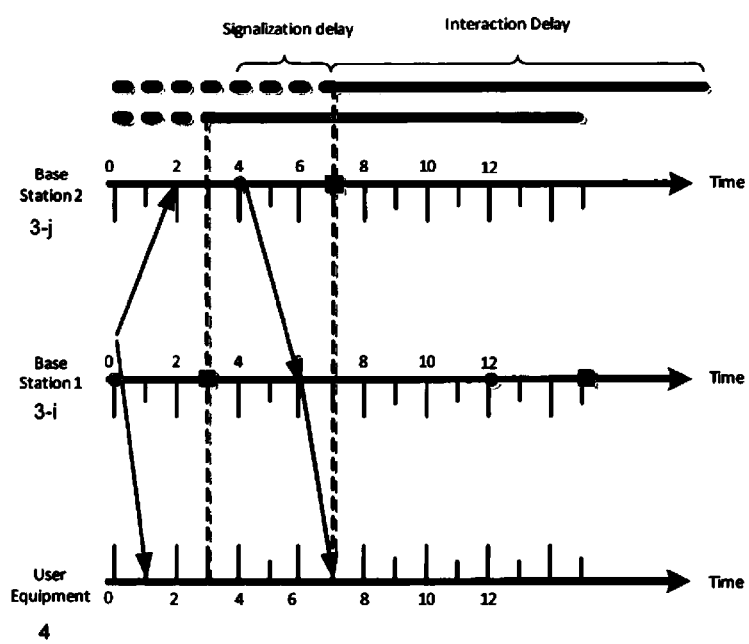
FIG. 5 shows a timing diagram for illustrating a communication between base stations and a UE according to an embodiment of the present invention, as employed in a possible implementation of a method according to an embodiment of the present invention.

FIG. 5 shows a timing diagram of a possible exemplary signalling protocol for exchange of PMIs between base stations of the wireless cellular network 1 and the UE 4. As shown in FIG. 5, a first base station 3-*i* provides another base station 3-*j* via the backhaul connection or interface with PMIs of PMs. At the same time this PMI information is sent by the first base station 3-*i* to its registered UE 4 as shown in FIG. 5. After this, the other base station 3-*j* provides the first base station 3-*i* also with PMI information of the used PMs. This received PMI information is then supplied by the first base station 3-*i* to its registered UE 4, as shown in FIG. 5. After this, the registered UE 4 registered with the first base station 3-*i* has information about the PMIs used by its anchor cell base station 3-*i* and the PMIs of the PMs used by the base station 3-*j* of its neighbouring cell. Depending on the exchanged PMIs supplied by the anchor cell base station 3-*i* and comprising the PMI of the anchor cell base station 3-*i* itself as well as the PMIs of the neighbouring cells of the anchor cell base station 3-*i*, the UE 4 registered with the anchor cell base station 3-*i* predicts the ICI caused by the base stations 3-*j* of all neighbouring cells 2-*i*, depending on the PMIs transmitted by the anchor cell base station 3-*i* downlink to the registered UE 4. FIG. 5 shows the signalization delay which is the time required for exchanging the active PMI information between the neighbouring base stations 3-*i* and 3-*j* and the additional time duration for downlink signalization to the UE 4. The interaction delay shown in the diagram of FIG. 5 is the time duration of a selected PMI configuration at any base station 3-*i*, 3-*j*. The interaction delay period is the same for both base stations 3-*i*, 3-*j*, as shown in FIG. 5, but shifted with respect to each other.

The maximum signalling overhead depends on the amount of ACI provided per cell. Moreover, the maximum signalling overhead comprises the transport of cell-IDs of the respective cells when exchanging the ACI. Moreover, the signalling overhead comprises a start time for the respective base station to use the exchanged PMIs and the duration time indicating how long the respective PMIs can be used for precoding. As can be seen in FIG. 5, there exists a trade off between interaction delay and PM adaption. A PM adaption is required to follow changes in the positions of the UE 4. For instance, the UE 4 might move for a predetermined number of wavelengths within the cell 2. Moreover, the PM adaption has to take into account the existence of new registered UEs 4 within the cells. With a short interaction delay the system can follow changes in the UE positions or in the existence of additional UEs 4 more easily. In contrast, a longer interaction delay ensures a better ICI estimation or prediction by the UE 4 due to the fact that interfering PMIs are only changed after signalization. Accordingly, there is a trade off between gain in terms of system throughout versus additional signalling overhead: With a larger interaction delay, the interference prediction has to be updated less frequently and thus the required signalling is lower. However, since PMIs can only be changed after the interaction delay has passed, the possibility to adapt the PMI to changing channel conditions between base station and UE is limited.

In a possible implementation of the method for estimating an ICI according to an embodiment of the present invention, the signalization delay as well as the interaction delay are preconfigured or adaptable depending on the required service applications provided by the cellular wireless network 1 to the UEs 4.

The PMI adaption can exhibit high dynamics at equivalent amounts of feedback overhead due to signalization of predefined PM sequences. In a possible implementation form of the method according to an embodiment, the exchanged PMIs can form a PM indication sequence. This PM indication sequence can comprise a fixed pattern of specific PMIs, as shown in FIG. 6 above, or a generic pattern of arbitrary PMIs as shown in FIG. 6 below. As shown in FIG. 6, a first PM indication sequence with a fixed pattern can, for instance, comprise the PMIs PMI1, PMI2, PMI1 and a second PM indication sequence with a fixed pattern can comprise the PMIs PMI4, PMI2, PMI3 as illustrated in FIG. 6.

In a possible implementation form the PM indication sequence can also comprise a generic pattern of arbitrary PMIs. As shown in FIG. 6, a first possible example for a generic pattern of arbitrary PMIs is the PM indication sequence PMIa, PMIa, PMIb. A further example for a PM indication sequence comprising a generic pattern of arbitrary PMIs is the sequence PMIb, PMIa, PMIa. For instance, PMIa can be instantiated by PMI1 and PMIb can be instantiated by PMI3. In this case, the first PM indication sequence becomes after specification PMI1, PMI1, PMI3. In an alternative implementation this generic sequence can also be specified in that the generic PMIa is specified to become PMI2 and the other generic PMIb becomes a specific PMI4. In this case the first generic PM indicator sequence becomes PMI2, PMI2, PMI4.

The neighbouring cells 2-*i* can exchange the current PM selection which is valid for a specified number of future subframes. This information exchange can easily be done in case of co-located antennas, e.g. sectors of the same site or between DASs connected to the same BBU. Cells 2-*i* belonging to a cell cluster for a wireless cellular network 1, as shown in FIG. 2, can coordinate their PM selection within a CB over an available frequency band according to a predefined sequence pattern. This sequence can use specific PMIs in a certain time/frequency pattern, as illustrated in FIG. 6. Moreover, it is possible that a definition of a generic time/frequency sequence is performed by using arbitrary PMIs, as shown in the lower part of FIG. 6.

Using a predetermined channel such as the PDCCH each cell 2-*i* can provide the ACI sequence to a set of neighbouring cells 2-*i* inside a cluster of cells 2-*i*. The selection of the active CB information ACI sequence which defines the order of the PMIs, is performed in time/frequency domain. In extension to a sequence selection per base station 3-*i*, a cluster of multiple base stations can, according to a possible implementation form, agree on using a common PM indication sequence. In a possible implementation form the PM indication sequences are defined in advance and are known to the base stations 3-*i* as well as to the UE 4.

The exchange of PM indicator sequences can be done on longer time scales such as on a radio frame basis. A further advantage of this approach lies in the fact that it allows for further reduction of the amount of information or data exchange, which is required between the different neighbouring base stations 3-*i* of the wireless cellular network 1, as shown for example in FIG. 2. The PM indicator sequences can be adjusted according to relative frequencies of PMI selections provided in the user specific PMI feedback. For instance, 20% of the UEs 4-*i* can report a PMI1, whereas the remaining 80% of the UEs within the cell report another PMI2. Depending on the relative choice of the PMI selections by the UEs the PM indicator sequences can be adjusted. In a possible implementation of the method for estimating an ICI in a cellular wireless network 1, it is possible to define different PM indicator sequences to serve different user groups over TDMA/FDMA. The required control signal overhead comprises the sequence of PMIs per cell 2-*i* as well as an identifier ID of the respective cell 2-*i* and a corresponding time-offset.

Figures 7A, 7B:
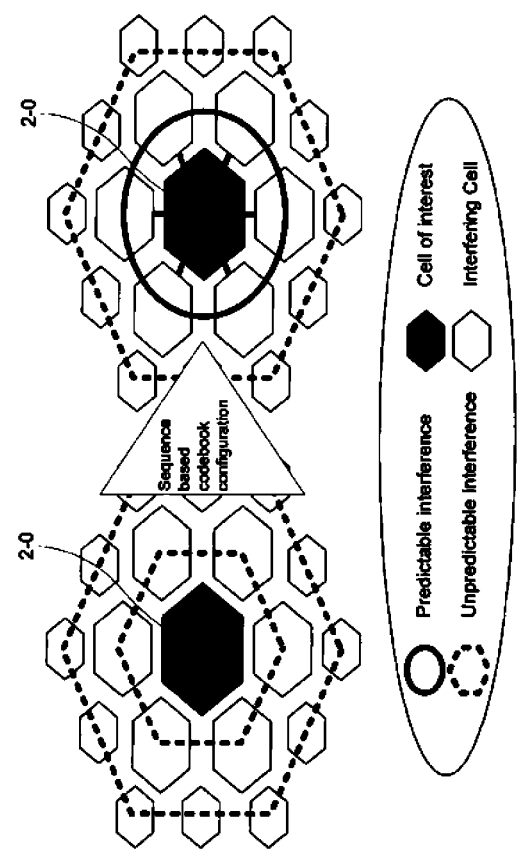
FIGS. 7A and 7B show diagrams for illustrating possible embodiments of a wireless cellular network.

FIGS. 7A, 7B show schematic diagrams for illustrating the operation of the method according to an embodiment of the present invention. In the schematic diagram of these figures the cells 2-*i* of a wireless cellular network 1 are illustrated, wherein different cells are located around an anchor cell 2-0, shown in FIGS. 7A and 7B in the center. As shown in these figures, the anchor cell 2-0 is surrounded by a first ring of cells which in turn is surrounded by a second ring of cells. In a possible implementation of the method according to an embodiment of the present invention the prediction of the ICI by a UE registered with the base station 3-0 of the anchor cell located in the center of the diagram shown in FIG. 7B is done depending on the PMIs, which are exchanged between the anchor cell base station 3-0 of the anchor cell 2-0 and the base stations 3-*i* of the neighbouring cells 2-I, which are located in the first ring around the anchor cell. In a still further possible implementation an ICI predicted by the UE registered to the base station 3-0 of the anchor cell 2-0 is performed not only depending on the PMIs exchanged between the anchor cell base station 3-0 of the anchor cell 2-0 and the base stations 3-*i* of the neighbouring cells 2-*i* in the first ring, but also depending on the exchanged PMIs used by the base stations 3-*i* in the second ring around the anchor cell 2-0.

Figures 8A, 8B:
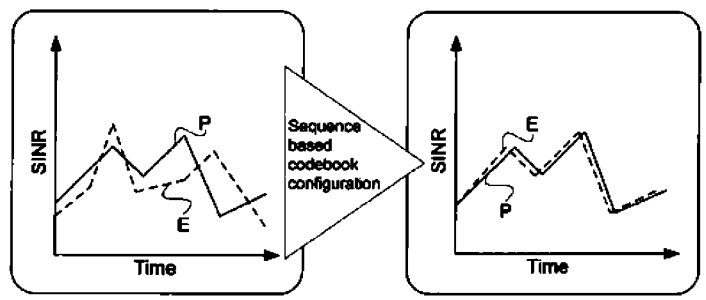
FIGS. 8A and 8B show diagrams for illustrating an improved connection signal quality achieved in a possible implementation of a method for providing a stabilized ICI in a cellular wireless network in comparison to the signal quality in a conventional cellular wireless network.

FIGS. 8A, 8B illustrate the situation in a conventional wireless cellular network in comparison to a situation when using a method for stabilizing an ICI in a wireless cellular network 1 according to the present invention. FIG. 8A represents the situation where cells in a conventional wireless cellular network adapt their downlink precoding matrices or precoders independently. Consequently, the SINR conditions are only imprecisely estimated (E) when compared to perfect (P), as illustrated in FIG. 8A. This effect of changing precoders on the variance of the SINR is commonly known as a flashlight effect which can be even more severe in a DAS. The effect of changing interference from neighbouring cells is called the flashlight effect. With the method according to an embodiment of the present invention, it is possible to reduce this flashlight effect in the wireless cellular network 1, as can be seen in FIG. 8B. In a possible implementation the method for estimating an ICI in a cellular wireless network 1 according to the present invention uses a standard CQI and PMI feedback of the users, but with a certain degree of coordination of the scheduling decisions taken by the base stations in the neighbouring cells. FIG. 8B shows the application of a coordination scheme for neighbouring cells as employed by the method according to an embodiment of the present invention. As can be seen in FIG. 8B, the SINR conditions can be estimated with high precision by the method for estimating an ICI according to an embodiment of the present invention. The remaining degradation visible in FIG. 8B mainly depends on Doppler shifts which can be handled separately by channel prediction.

A potential quantitative gain in data throughput can be achieved when SINR can be predicted using a method for estimating an ICI in a cellular wireless network 1 according to an embodiment of the present invention. This potential quantitative gain in throughput is achieved thanks to a coordination between the base stations 3-*i* compared to a conventional wireless cellular network where no coordination in this respect is provided.

In order to model a behaviour of a dynamically changing spatially shaped interference for neighbouring cells 2-*i* it is possible to use a Poisson distribution to model the duration of a CB entry of a PM CB comprising several PMs being actively used at a certain base station 3-*i* of the wireless cellular network 1.

Figure 9:
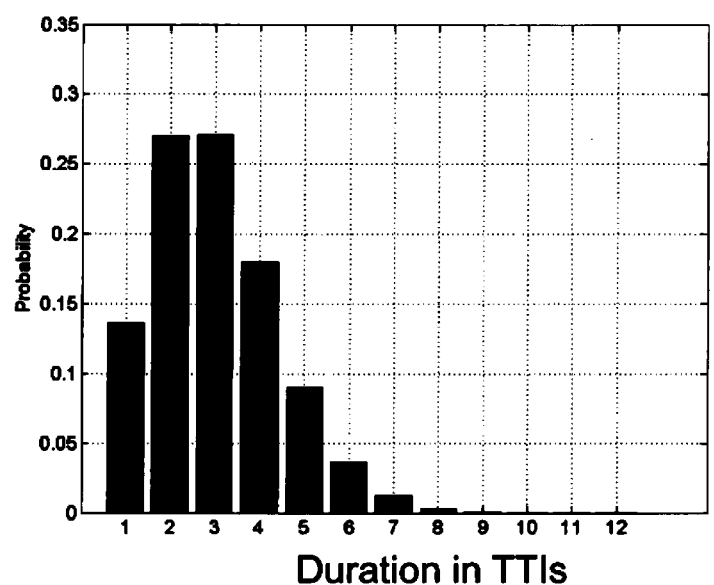
FIG. 9 shows a diagram for illustrating a switching probability in a cellular wireless network according to a possible implementation of the present invention.

The Poisson distribution can be given by:

$$P_\lambda(x) = \frac{\lambda^{(x-1)}}{(x-1)!} e^{-\lambda} \quad x \geq 1,$$

with λ being the coherence time, which can be given here in terms of a certain amount of TTIs, with TTI being the transmission time interval corresponding to a subframe; wherein x is the duration in subframes. For the following evaluations, λ=2TTIs has been used FIG. 9 shows a diagram for illustrating the switching probability for λ=2 transmission time intervals. As can be seen in FIG. 9, in the given simulation in about 14% of the cases switching between PMIs used by the base station in each cell is performed after each subframe. In about 26% of the cases the switching is performed after every second subframe.

In the simulation it is assumed that each CB entry or the PM in neighbouring cells is randomly selected following a uniform distribution. The PMs or precoders are selected by a scheduling entity provided in each cell of the wireless cellular network. Consequently, its selection can behave random-like from the perspective of the UE in the different cells. Further, in the simulation it is assumed that each CB entry or PM in each cell is active for a certain number of subframes, for example for two subframes. This can be the case due to scheduling decisions when selecting the same UE to be served for future subframes or when selecting a second UE for future subframes but this second UE has reported the same PMI as the first UE. Each subframe can have a predetermined number of symbols such as OFDM symbols. A predetermined number of symbols are transmitted during a transmission time interval, TTI, corresponding to one subframe.

Figure 10:
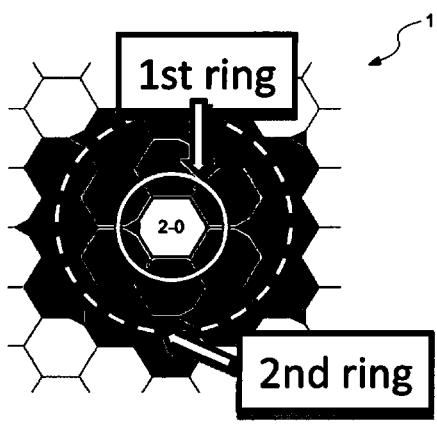
FIG. 10 shows a schematic diagram of a possible implementation of a wireless cellular network according to an embodiment of the present invention.

FIG. 10 shows a schematic diagram of a wireless cellular network 1 with a first and a second ring of neighbouring cells around an anchor cell 2-0. Strong interference from the first ring of neighbouring cells 2-*i* causes the most of the SINR degradation at a UE registered with the anchor cell base station 3-0 of the anchor cell 2-0. Hence, predicting the multi cell interference or ICI provides significant gains. This prediction is performed by the method for estimating an ICI in a cellular wireless network 1 according to an embodiment of the present invention.

Figure 11:
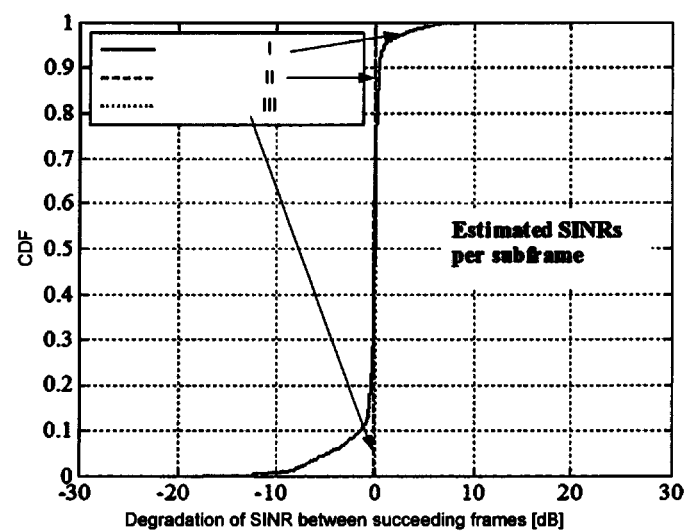
FIG. 11 shows a diagram for illustrating a probability distribution to illustrate an effect provided by a method according to an embodiment of the present invention in comparison to a conventional cellular wireless network.

As shown by the diagram in FIG. 11, additional gains from predicting interfering signals caused by base stations of the second surrounding ring are rather small. FIG. 11 shows a diagram with cumulative probability distribution functions, CDF, which represent the SINR degradation between succeeding frames. In particular, the SINR degradation is the difference between the SINR estimated at the UE during frame n and the measured SINR during the succeeding frame n+1. The degradation is mainly caused by a change of PMIs in neighbouring cells, and since PMIs may change after frames only, the SINR degradation will be observed between succeeding frames. The first curve I shows the case where no coordination between the base stations 3-i of the wireless cellular network 1 takes place. The second curve II is almost identical with the third curve III, wherein the second curve II shows the case where PMIs are exchanged between the anchor cell base station 3-0 and the base stations of the direct neighbouring cells in the first ring of the wireless cellular network 1, whereas the curve III shows the case where the PMIs are not only exchanged between the anchor cell base station 3-0 of the anchor cell 2-0 and the base stations of the immediately neighbouring cells, but also with the base stations located in the second ring around the anchor cell 2-0. Accordingly, in most applications the exchanging of PMIs between the anchor cell base station 3-0 of the anchor cell 2-0 and the base stations of the direct neighbouring cells of the first ring around the anchor cell 2-0 is sufficient as illustrated by FIG. 11.

Figure 12:
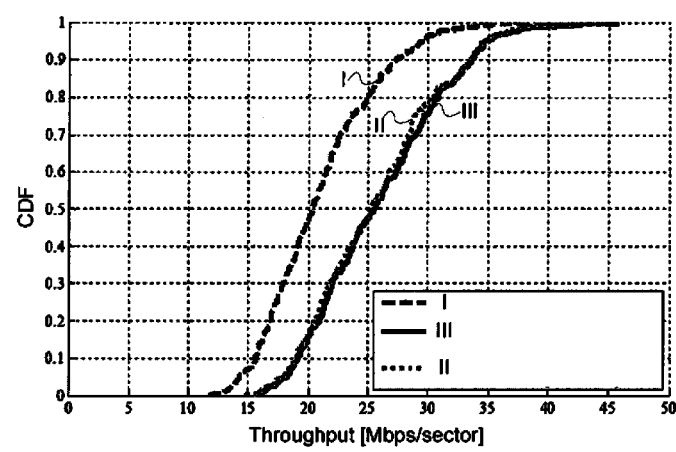
FIG. 12 shows a further diagram for illustrating a probability distribution of a throughput to illustrate an effect of a method according to an embodiment of the present invention in comparison to a conventional cellular wireless network.

FIG. 12 shows another integrated probability distribution function, CDF, for the achievable throughput of a sector or base station of the anchor cell. The first curve I shows again the case where no coordination between the base stations takes place such as in a conventional wireless cellular network. The almost identical curves II, III show the cases where sequence based coordination or exchange of PMIs takes place among all cells (curve III) of the first and second ring and where a sequence based coordination takes place only among direct neighbouring cells, i.e. between the anchor cell 2-0 and the cells of the first ring (curve II). Again it can be seen that the gains from predicting interference signals caused by base stations of the second ring are relatively small. FIG. 12 shows the impact of the flashlight without any countermeasures as done in a conventional wireless network in comparison to a cellular wireless network using the method for estimating an ICI, according to an embodiment of the present invention. Curve III shows the situation where a complete knowledge of the CB and PM configurations in all neighbouring cells is provided.

As can be seen in FIG. 12, the system throughput degrades by 20% at the median value due to the flashlight effect. With the sequence based PM coordination which considers all cells in the first tier or ring, it is possible to mitigate almost the complete degradation with respect to the median value of the ideal feedback case, translating to a gain of approximately 25%. There is only small additional gain when coordinating the base stations of all neighbouring cells, including the first and second tier or ring around the anchor cell 2-0.

With the method providing a stabilized ICI in a cellular wireless network 1, using the predictions gained by the method for estimating an ICI in a cellular wireless network 1 according to an embodiment of the present invention, an almost static behaviour of the ICI can be achieved by a coordinated selection of PM configurations within a cluster of neighbouring cells or by a regular pattern of PM configurations.

The almost static ICI provides stable CQI measurements of the UE that do not change for a specific time duration, thus enabling a significant throughput gain for single UEs as well as for the entire system.

These performance gains come at low cost of additional signalling overhead since the exchange of PMIs does only occupy a small bandwidth in the backhaul network connecting the base stations 3-i. The coordination of PM selection can take place within a set of neighbouring cells within the wireless network 1. This coordination can use specific coordination schemes. Regular patterns of PM configurations can be used. Different patterns for a systematic switching between PM configurations can be employed. A scheme for pattern adaption can depend on the current (global) user demands.

In a possible implementation a central control entity or unit can choose the CBs and the precoding matrices of these CBs for neighbouring cells such that an interference shaping can be applied to improve the CQI conditions. When the interference conditions are stabilized, reliable ICI estimations can be performed at the UE. These translate to improved SINR values which are reflected in the corresponding CQI information.

As shown in FIG. 2, a cluster of neighbouring cells 2-i can be defined. The definition of the set of neighbouring cells within the cluster constituting the area of coordinated base stations 3-i can be defined without backhaul constraints or with backhaul constraints.

The definition of the set of neighbouring cells within a cell cluster of a wireless cellular network 1 can be performed without considering backhaul constraints of the backhaul network connecting the base stations 3-i so that the information for CB and PM coordination is exchanged within all cells in the vicinity of the anchor cell 2-0, i.e. the cell of interest in the middle of the cluster, as shown in FIG. 2.

The selection or definition of the set of neighbouring cells can also take into account backhaul constraints of the backhaul network or interface between the base stations. For example, based on the UE feedback, UEs are assumed to report on less than their six strongest interfering cells. Thus, each base station can evaluate this feedback of the UE and establish an inter-base station connection to neighbouring cells of highest relevance.

In a further possible implementation a set of cells forming a cell cluster can be defined by the network operator and can remain constant for a longer period.

According to a possible implementation form of the UE according to an embodiment of the present invention, the determination unit of the UE can be a processor being adapted to predict an ICI at the UE, caused by the base stations of the neighbouring cells, depending on PMIs of PMs, the PMIS being exchanged between the anchor cell base station of the anchor cell and the base stations of the neighbouring cells.

According to a further implementation form, a base station of a cellular wireless network is provided. In a possible implementation form of this base station the base station comprises an evaluation unit or a processor, which is adapted to evaluate an ICI predicted by a UE registered with the base station.

The method and apparatus according to the different embodiments of the present invention allow a reliable prediction of changes in the selection of PMIs in base stations of adjacent cells based on predefined time frames. Thus, an ICI situation is predictable in each cell of the wireless cellular network. The estimation of the ICI in each cell allows a reliable configuration of precoding and transmission configurations for the current anchor cell to which the UE is registered.

In a wireless cellular network the CQIs are used to adapt to small-scale fading in scheduling processes. Therefore, the CQIs are provided on a subframe basis. Additional PMIs are provided by the UE in order to indicate which beam index is desired and for which index CQI feedback is provided. The PMIs can be selected based on a geo-location of the specific UE so that different PMIs of the UE represent a spatial user distribution. The positions of UEs within a cell can change so that a corresponding adaption of the CBs and/or PMIs of the PMs within the CBs and a certain degree of coordination between the neighbouring base stations can be performed. In order to adapt to small-scale fading behaviour of the channel, the CQI feedback on the UE can still be provided on different time scales. Accordingly, in a possible implementation a different time scale for the coordination of the PMIs and the CQI information can be used.

The method for estimating an ICI in a cellular wireless network according to an embodiment of the present invention and the method for providing a stabilized ICI in a cellular wireless network according to a further embodiment of the present invention can be performed by computer programs executed by an execution unit or processor of the base station and/or UEs within the wireless network. The prediction of the ICI can be performed by the determination unit of the UE. This determination unit can be a microprocessor performing the prediction by executing corresponding instructions of a computer program. The computer program may be stored in a computer readable storage medium, such as e.g. a ROM, a magnetic disk or an optical disk. The exchange of the PMIs between the anchor cell base station and the base stations of the neighbouring cells can be performed by a predetermined protocol.

What is claimed is:

1. A user equipment (UE) configured to be registered with an anchor cell base station of an anchor cell of a cellular wireless network, the UE comprising a processor and a non-transitory computer readable storage medium containing instructions for execution by the processor such that when the instructions are executed by the processor, the processor is configured to provide the following:
   receive precoding matrix indicators (PMIs) of precoding matrices (PMs), where the PMIs have been exchanged among the anchor cell base station and base stations of neighbouring cells and where the received PMIs are a configuration of PMIs to be maintained by the base stations of the neighbouring cells for a duration of time;
   predict an inter cell interference (ICI) at the UE caused by the base stations of the neighboring cells, according to the configuration of PMIs; and
   send the predicted ICI to the anchor cell base station for use by the anchor cell base station to (a) select a PMI of a PM and (b) inform the base stations of the neighbouring cells of the selection and the duration of time.

2. The UE according to claim 1, wherein the processor is further configured to predict the ICI at the UE on the basis of the PMIs and channel transfer functions of physical channels between the UE and each of the base stations of the neighbouring cells.

3. The UE according to claim 1, wherein the PMIs indicate an optimum PM used by the anchor cell base station for a current channel condition between the anchor cell base station and the UE.

4. The UE according to claim 1, wherein the processor is further configured to receive from the anchor cell base station PMIs supplied as active codebook information (ACI) via a physical downlink control channel (PDCCH).

5. The UE according to claim 4, wherein the ACI comprises a timestamp indicating how long the ACI is valid.

6. The UE according to claim 1, wherein the PMIs form a PM indication sequence comprising a fixed pattern of specific PMIs.

7. The UE according to claim 1, wherein the PMIs form a PM indication sequence comprising a generic pattern of arbitrary PMIs.

8. The UE according to claim 1, wherein the processor is further configured to send the predicted ICI to the anchor cell base station for selecting a PMI of a matching PM that maximizes a signal-to-noise-plus-interference ratio of a reception signal received by the UE in the anchor cell.

9. A method for estimating an inter cell interference (ICI) in a cellular wireless network comprising cells, wherein each cell comprises a base station, the method comprising:
   exchanging precoding matrix indicators (PMIs) of precoding matrices (PMs) among an anchor cell base station of an anchor cell and base stations of neighboring cells, where the exchanged PMIs from the base stations of the neighbouring cells are a configuration of PMIs to be maintained by the base stations of the neighbouring cells for a duration of time;
   supplying, by the anchor call base station, the configuration of PMIs to a user equipment (UE) registered with the anchor cell base station;
   predicting, by the UE, an inter cell interference (ICI) at the UE caused by the base stations of the neighbouring cells, according to the configuration of PMIs supplied by the anchor cell base station; and
   sending, by the UE, the predicted ICI to the anchor cell base station for (a) selecting a PMI of a PM and (b) informing the base stations of the neighbouring cells of the selection and the duration of time.

10. The method according to claim 9, wherein the ICI is predicted at the UE on the basis of the PMIs and channel transfer functions of physical channels between the UE and each of the base stations of the neighboring cells.

11. The method according to claim 9, wherein the UE receives from the anchor cell base station PMIs supplied as active codebook information (ACI) via a physical downlink control channel (PDCCH).

12. The method according to claim 11, wherein the ACI comprises a timestamp indicating how long the ACI is valid.

13. The method according to claim 9, wherein the UE sends the predicted ICI to the anchor cell base station for selecting a PMI of a matching PM that maximizes a signal-to-noise-plus-interference ratio of a reception signal received by the UE in the anchor cell.

14. A base station of an anchor cell of a cellular wireless network, the base station comprising:
   a processor and a non-transitory computer readable storage medium containing instructions for execution by the processor such that when the instructions are executed by the processor, the processor is configured to provide the following:
   exchange with base stations of cells neighbouring the anchor cell precoding matrix indicators (PMIs) of precoding matrices (PMs), where the exchanged PMIs are a configuration of PMIs to be maintained by the base stations of the neighbouring cells for a duration of time;

send the configuration of PMIs to a user equipment (UE) in the anchor cell;

receive, from the UE, an inter cell interference (ICI) caused by the base stations of the neighbouring cells as predicted by the UE from the configuration of PMIs;

select a PMI of a matching PM that maximizes a signal-to-noise-plus-interference ratio of a reception signal received by the UE; and inform the base stations of the neighbouring cells of the selection and the duration of time.

15. The base station according to claim 14, wherein the base station is configured to send to the UE PMIs supplied as active codebook information (ACI) via a physical downlink control channel (PDCCH).

16. The base station according to claim 14, wherein the predicted ICI is based on the PMIs and channel transfer functions of physical channels between the UE and each of the base stations of the neighboring cells.

17. A wireless cellular network comprising:

a plurality of cells, each comprising a base station configured to exchange precoding matrix indicators (PMIs) of precoding matrices (PMs) among the base stations of neighbouring cells, where the exchanged PMIs are a configuration of PMIs to be maintained by the base stations of the neighbouring cells for a duration of time;

a user equipment (UE) configured to be registered with an anchor cell base station of one of the cells and configured to predict an inter cell interference (ICI) at the UE, caused by the base stations of the neighbouring cells, according to the configuration of PMIs and (b) sending the predicted ICI to the anchor cell base station; and the anchor cell base station configured to (a) select a PMI of a PM based on the predicted ICI and (b) inform the base stations of the neighbouring cells of the selection and the duration of time.

18. The wireless cellular network according to claim 17, wherein the UE is configured to predict the ICI on the basis of the PMIs and channel transfer functions of physical channels between the UE and each of the base stations of the neighbouring cells.

19. The wireless cellular network according to claim 17, wherein the UE is configured to receive from the anchor cell base station PMIs supplied as active codebook information (ACI) via a physical downlink control channel (PDCCH).

20. The wireless cellular network according to claim 17, wherein the UE is configured to send the predicted ICI to the anchor cell base station for selecting a PMI of a matching PM that maximizes a signal-to-noise-plus-interference ratio of a reception signal received by the UE in the anchor cell.

* * * * *

UNITED STATES PATENT AND TRADEMARK OFFICE
CERTIFICATE OF CORRECTION

PATENT NO. : 9,998,249 B2
APPLICATION NO. : 14/739897
DATED : June 12, 2018
INVENTOR(S) : Lars Thiele et al.

It is certified that error appears in the above-identified patent and that said Letters Patent is hereby corrected as shown below:

On the Title Page

Item [57], Line 6, "neighboring" should read --neighbouring--

Page 2, Item [57], Line 3, "neighboring" should read --neighbouring--

Signed and Sealed this
Sixteenth Day of July, 2019

Andrei Iancu
*Director of the United States Patent and Trademark Office*